July 31, 1956     H. ALLEN ET AL     2,756,634

RETRACTABLE ARBOR MISSILE PROJECTOR

Filed May 18, 1949     4 Sheets-Sheet 1

INVENTORS
HERBERT ALLEN
MADDEN T. WORKS
MARVIN R. JONES
BY
ATTORNEY

July 31, 1956     H. ALLEN ET AL     2,756,634
RETRACTABLE ARBOR MISSILE PROJECTOR
Filed May 18, 1949     4 Sheets-Sheet 2
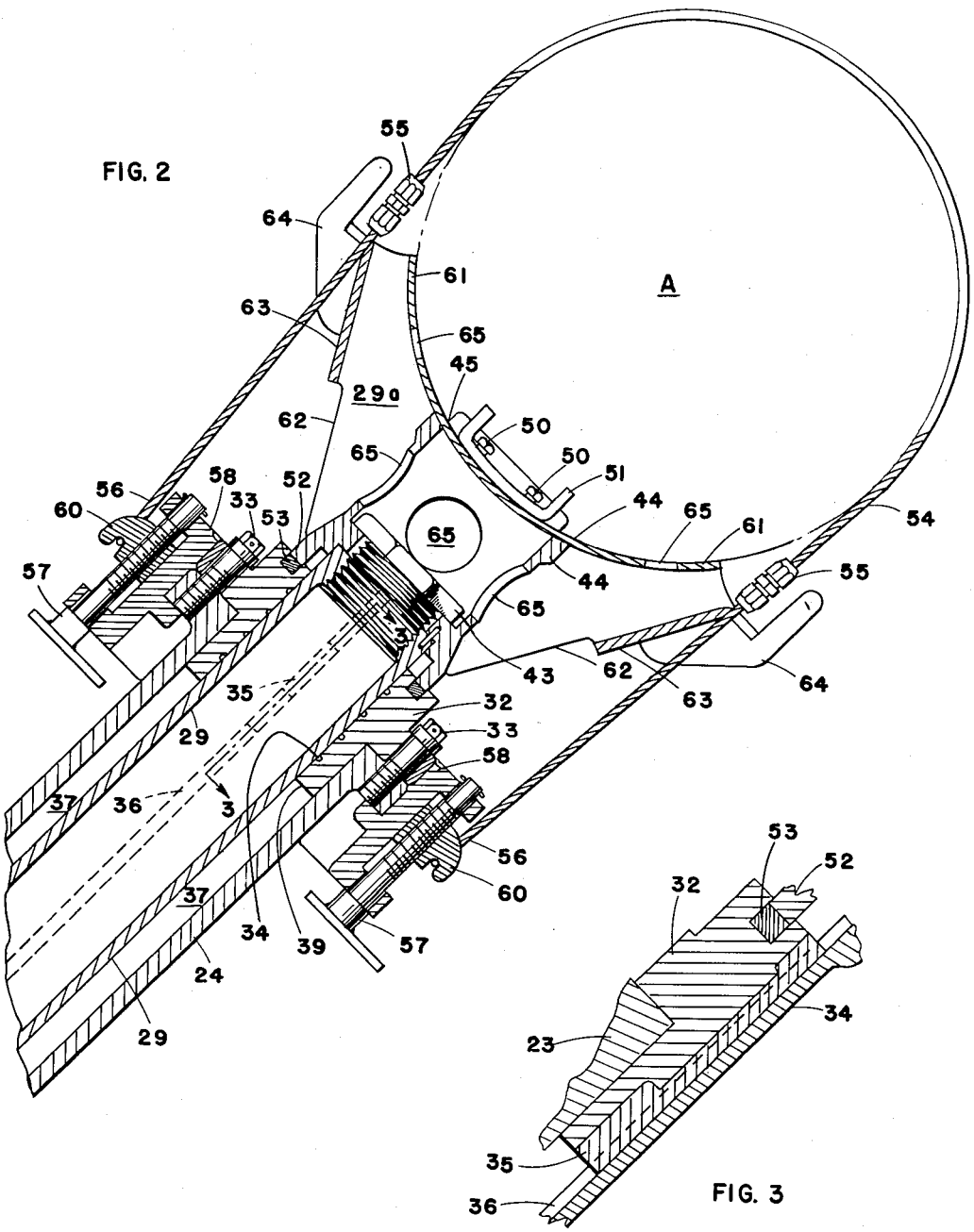
INVENTORS
HERBERT ALLEN
MADDEN T. WORKS
MARVIN R. JONES July 31, 1956     H. ALLEN ET AL     2,756,634
RETRACTABLE ARBOR MISSILE PROJECTOR
Filed May 18, 1949     4 Sheets-Sheet 3

INVENTORS
HERBERT ALLEN
MADDEN T. WORKS
MARVIN R. JONES

BY
ATTORNEY

July 31, 1956

H. ALLEN ET AL 2,756,634

RETRACTABLE ARBOR MISSILE PROJECTOR

Filed May 18, 1949

INVENTORS
HERBERT ALLEN
MADDEN T. WORKS
MARVIN R. JONES

BY

ATTORNEY

United States Patent Office 2,756,634
Patented July 31, 1956

2,756,634

RETRACTABLE ARBOR MISSILE PROJECTOR

Herbert Allen, Madden T. Works, and Marvin R. Jones, Houston, Tex., assignors, by mesne assignments, to the United States of America as represented by the Secretary of the Navy Application May 18, 1949, Serial No. 93,915

5 Claims. (Cl. 89—1)

This invention relates to projectors and more particularly to apparatus for projecting large objects such as depth charges.

The present invention is of particular value in the conduct of naval warfare since the use of depth charges in anti-submarine action has become increasingly important in the protection of surface vessels. This is especially true in view of improvements in the speed and maneuverability of submarines requiring quick action to be taken if they are to be destroyed or put out of action before they are able to inflict damage on the surface vessels or make their escape.

Some of the factors which control the effectiveness of this type of anti-submarine action reside in the number of depth charges that may be released from surface vessels in a relatively short period of time as well as the pattern formed by the charges as they descend in the water near what is judged to be the location of the enemy submarine. Thus, the control of the pattern through accuracy of projecting the depth charge, the number of charges that can be launched and uniformity of the rate of descent of the charges through the water may determine the ultimate success of the action.

In the construction of depth charge projectors it was formerly the practice to secure the depth charge to a cradle mounted on the end of a cylindrical arbor which telescoped over or into a projector tube and, by the use of an explosive, the charge with arbor attached was suddenly projected from the firing vessel. In some prior projectors the charge and cradle were permanently secured together. This was objectionable since the arbor interfered with the descent of the charge into the water so that the rate of descent could not be calculated. In others the depth charge was automatically freed from the cradle at the top of its trajectory before striking the water. In either event presence of the arbor and the cradle affected the flight or rate of sinking of the depth charge and of necessity they had to be expendable items. New arbors and cradles were required for each charge fired.

To overcome the obvious disadvantages of the above prior devices there has heretofore been proposed a projector in which the arbor and cradle were restrained or held captive and did not accompany the charge in its flight. To do this required the use of a stop to limit outward arbor travel and thus prevent it from leaving the tube. This sudden stopping of the outward movement of the arbor traveling under the tremendous explosive force required to operate the device was unsatisfactory since the entire projector was subject to a sudden severe upward force as the restraining means took effect and this might very well result in tearing the projector loose from its mount or seriously interfering with its operation at a critical time.

The present invention contemplates a depth charge projector in which the depth charge is automatically freed from its moorings when the arbor starts its projecting movement and, as the arbor approaches the limit of its extending movement, it is stopped gradually but positively without imposing any undesirable side thrust or twist on the arbor as the depth charge leaves the cradle such as might throw the charge off its intended trajectory.

An object of the present invention, therefore, is to provide a projector by which a relatively large object may be thrown a considerable distance without any cradle or arbor attached.

Another object is the provision of a device of the aforementioned character in which a missile without an attached arbor or fixture may be normally supported by a cradle and the missile guided by said cradle during the initial projecting movement.

A further object is the provision in a device of the above character of means to cushion the arresting action on the arbor and cradle and wherein such cushioning means does not twist or cant the arbor in its arresting action.

Another object is the provision of a depth charge projector wherein propulsive gases may be used to both propel and cushion the movement of the arbor.

A still further object is the provision of a depth charge projector which is simple in construction, safe in operation and wherein the operating parts are effectively protected against the elements while awaiting use.

An additional object is the provision of cushioning or snubbing means which is built in as an integral part of the projector design.

A further object is the provision of novel means for lashing the depth charge to the cradle and for retaining the cradle in place on the projector until the projector is fired.

An additional object is the provision of improved means for releasing such lashings and for preventing injury to operating personnel at the time of release.

These and other objects and attendant advantages of the present invention will be readily apparent from the following description taken in conjunction with the accompanying drawings in which:

Fig. 2 is a continuation of Fig. 1 showing the muzzle end of the same projector and illustrating how a depth charge may be secured in place;

Fig. 3 is an enlarged detail view of the key employed to prevent rotation of the arbor and is taken along a line substantially corresponding to line 3—3 of Fig. 2;

Figure 1:
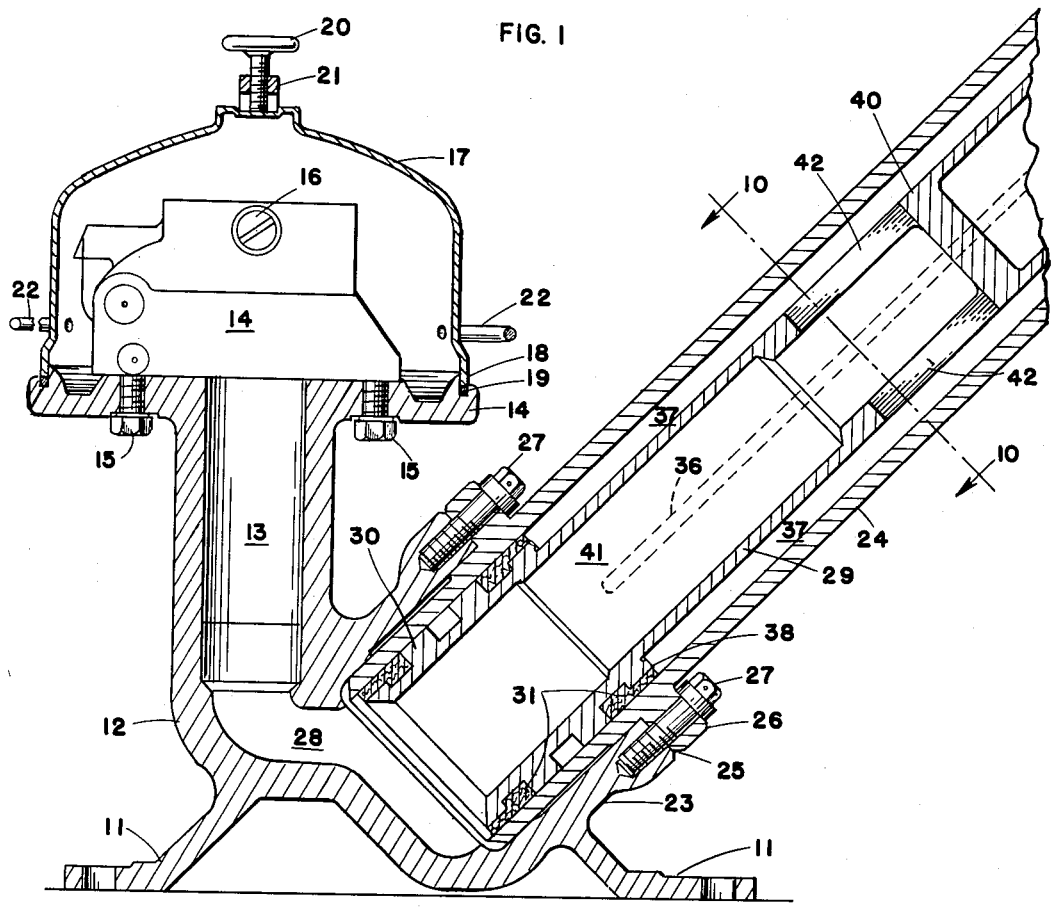
Fig. 1 is a vertical longitudinal cross-section taken at the breech end of a depth charge projector and illustrating one embodiment of the present invention.

Referring now to the drawings and more particularly to Figs. 1 and 2 wherein the present invention is shown embodied in a depth charge projector. The projector is supported upon a flanged base 11 which may be secured to the deck of a vessel by bolts as desired. This base supports a housing 12 which includes a vertically disposed propellant receiving chamber 13 having a propellent exploding breech mechanism 14 at its upper end. A suitable breech mechanism for this purpose is shown in U. S. Patent 2,399,248 issued to W. E. Patrick, Jr. et al. under date of April 30, 1946.

The breech assembly 14 may be retained in place by suitable hold down screws 15 which are preferably equally spaced from each other to permit the breech mechanism to be secured in different rotated positions so that the breech operating handle 16 may extend from the projector at any desired angle. A protective hood 17 covers the breech mechanism when not in use and prevents the entrance of moisture and dirt. The lower edge 18 of this hood is held firmly against a packing ring 19 by a hand wheel operated screw 20 threaded through a semicircular bail 21 whose ends (not shown) are pivotally attached to opposite sides of the housing. Handles 22 are provided for lifting the cover.

Extending outwardly from the housing 12 is a short integral projecting portion 23 which is suitably bored to receive the lower end of a projector tube 24 and support it at an angle of approximately 45°. The portion 23 has a smooth face 25 against which the flange 26 of the tube is retained in leakproof engagement by cap screws 27. Expansion passage 28 leads from the propellant chamber 13 to the interior of the projector tube 24.

Mounted for reciprocating movement in the projector tube and extensible by the pressure of gases emanating from a cartridge exploded in the propellant chamber is a tubular arbor 29 on the upper end of which is mounted a missile carrying cradle 29a and the lower end of this arbor is enlarged at 30 to slidably fit in the bore of the projector tube 24. Suitable packing rings 31 may be fitted into annular grooves in the enlargement 30. A flanged arbor guide bushing 32 is secured to the upper end of the projector tube by screws 33 and this bushing has a key 35 fitted into keyway 36 in the arbor so that the latter may freely reciprocate therein but cannot rotate.

It will be observed that the outer diameter of the arbor 29 and the inner wall of the projector tube 24 are spaced apart to form an annular chamber 37 closed at one end by the radial ledge 38 of the enlarged portion 30 on the arbor and at the other end by the inner face 39 of the guide member 32.

Approximately midway between the ends of the arbor a transverse partition 40 serves as a pressure receiving surface against which the explosive gases impinge to drive the arbor outwardly in its projecting movement. The hollow interior 41 of the arbor permits gases emanating from a cartridge discharged in the cartridge chamber to pass therethrough and against partition 40. A part of these gases enter the annular chamber about the arbor through elongated slots which may be in any suitable number such as the two spaced slots 42 of Figs. 1 and 4 or the spaced pairs of slots 42a shown in Fig. 10.

The depth charge cradle 29a may be rigidly secured to the upper end of the extensible arbor by the large screw cap 43 and is preferably of welded sheet metal construction. As illustrated in Figs. 2, 4, 5 and 6 this cradle comprises a transverse trough 45 offset slightly to one side of the center axis of the arbor. This trough is provided with a number of apertures to reduce its weight. As illustrated trough 45 has triangular braces 46 welded to its undersurface with the edges of the braces also welded to an arbor hub 44. A relatively thin strip of sheet metal 47 (Fig. 6) interconnects the braces 46 and a suitable stop 48 may be secured to the end of the cradle to prevent end movement of a depth charge in the cradle.

A reinforcement 49 may be welded to the underside of the trough 45 and may be provided with spaced holes which are threaded to receive cap screws 50 (Figs. 2 and 4) by means of which a U-shaped stop 51 may be rigidly attached to the trough at either end as required.

The cradle trough 45 may be formed from a cruciform shaped sheet of metal by rounding the short laterally extending side arms 61 upwardly to conform with the shape of the missile. Arms 61 are each supported by a reinforcing rib 62 of sheet metal shaped so that its vertical edges may be welded to arbor hub 44 and formed with a flat portion 63 to which may be welded spaced fingers 64 forming cable guides. These guide fingers are spaced apart a sufficient distance to permit the lashing cable 54 to pass therebetween when the depth charge is lashed in place but the cable end couplings 55 will not pass through the guide slots.

The weight of the cradle may be substantially reduced by perforations 65, provided in braces 46, hub 44, metal strip 47 and trough 45 and the effect of this saving of weight is to minimize the inertia of the parts. The true center of the cradle is intentionally placed to one side of the axis of the projector tube and stop 51 may be shifted from one side to the other in order to accommodate missiles of different designs and shapes. This permits the use of missiles of varying length or whose center of gravity may be changed by the addition of a counterweight. By this arrangement the missile may always be so positioned in the cradle that the projecting force will be applied in the line of the centre of gravity.

The arbor hub 44 is preferably provided with a depending shield 52 the lower edge of which bears against packing ring 53 in an annular groove in the arbor guide bushing 32 when the arbor is in retracted position thereby providing a seal for preventing the entrance of moisture and dirt.

Figure 5:
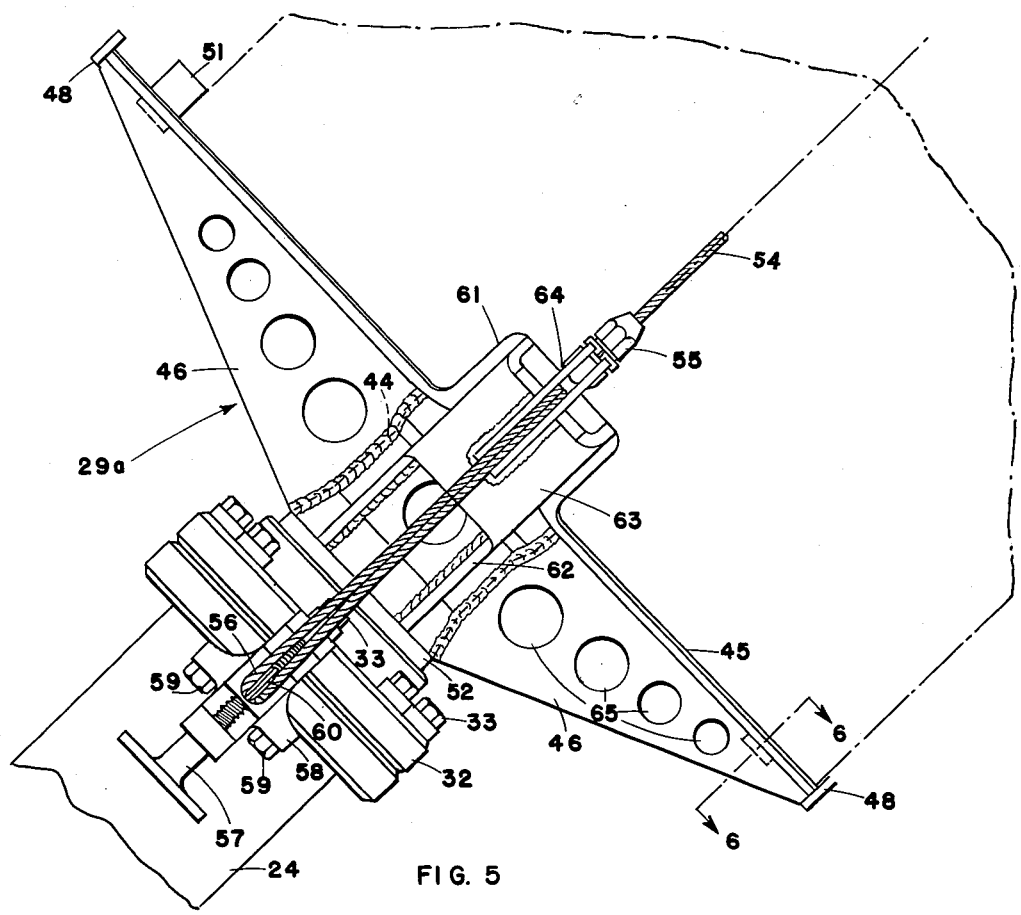
Fig. 5 is a top elevation view showing the projectile supporting cradle and lashings in ready condition.
Figure 7:
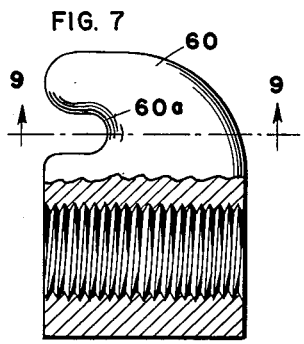
Fig. 7 is a sectional view greatly enlarged and partially in elevation of a cable shearing member used in the present invention.
Figure 8:
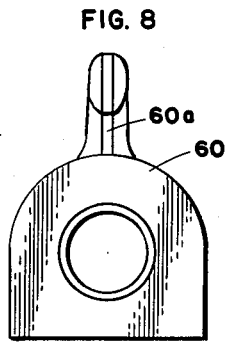
Fig. 8 is an end view of the cable shearing member of Fig. 6.
Figure 9:
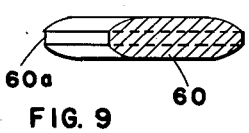
Fig. 9 is a horizontal section of the shearing member looking upwardly and taken along a line substantially corresponding to line 9—9 of Fig. 7.

When a missile is in place the lashing cable 54 may encircle the missile in the manner indicated and to each end of the cable is secured a coupling 55 which affixes looped strands 56 to the ends of cable 54. Tension is applied to the cable by rotating the adjusting screws 57 mounted in brackets 58 and attached to the projector tube by screws 59 (Fig. 5). In Figs. 7, 8 and 9 it will be observed that the shear portions 60 of the cable tension devices do not present a sharp edge in contact with loops 56 but instead, the bottom of the notch 60a which engages the inner surface of the loop is dubbed off, the flat being on the order of $3/_{32}$ of an inch in width. This permits a depth charge to be safely carried in the cradle with sufficient tension on the cable to prevent the accidental dislodgment of the charge and also keeps the cable from being partially sheared in the loading operation.

*Operation*

Assuming that a missile has been lashed to the cradle and the cable tension devices have been adjusted to hold the missile securely to the cradle as illustrated in Fig. 1, the protective hood 17 is first removed by loosening screw 20 thereby permitting bail 21 to swing clear of the cover. The breech mechanism is then opened by manipulation of operating handle 16 and an explosive charge is placed in the propellant receiving chamber 13. The projector is now ready for firing which may be done either manually at the projector or by electrical control from a remote point. When the cartridge explodes the rapidly expanding gases pass through the expansion passage 28 into bore 41 in the lower end of the arbor and drive the arbor and cradle, together with the depth charge A, rapidly outward. The initial movement of the cradle and charge stretches the looped ends 56 of the lashing cable tightly over the shear surfaces 60a and, as the outward movement continues, couplings 55 may be struck by the cable guides 64 exerting positive shearing tension on the extremities of the loops against the shear members. As the cable ends sever the cable body 54 is free to be carried away with the depth charge as shown in Fig. 2. The severing occurs at both ends substantially simultaneously and, because of the guides, the cable cannot whip around with possible injury to operating personnel.

Figure 4:
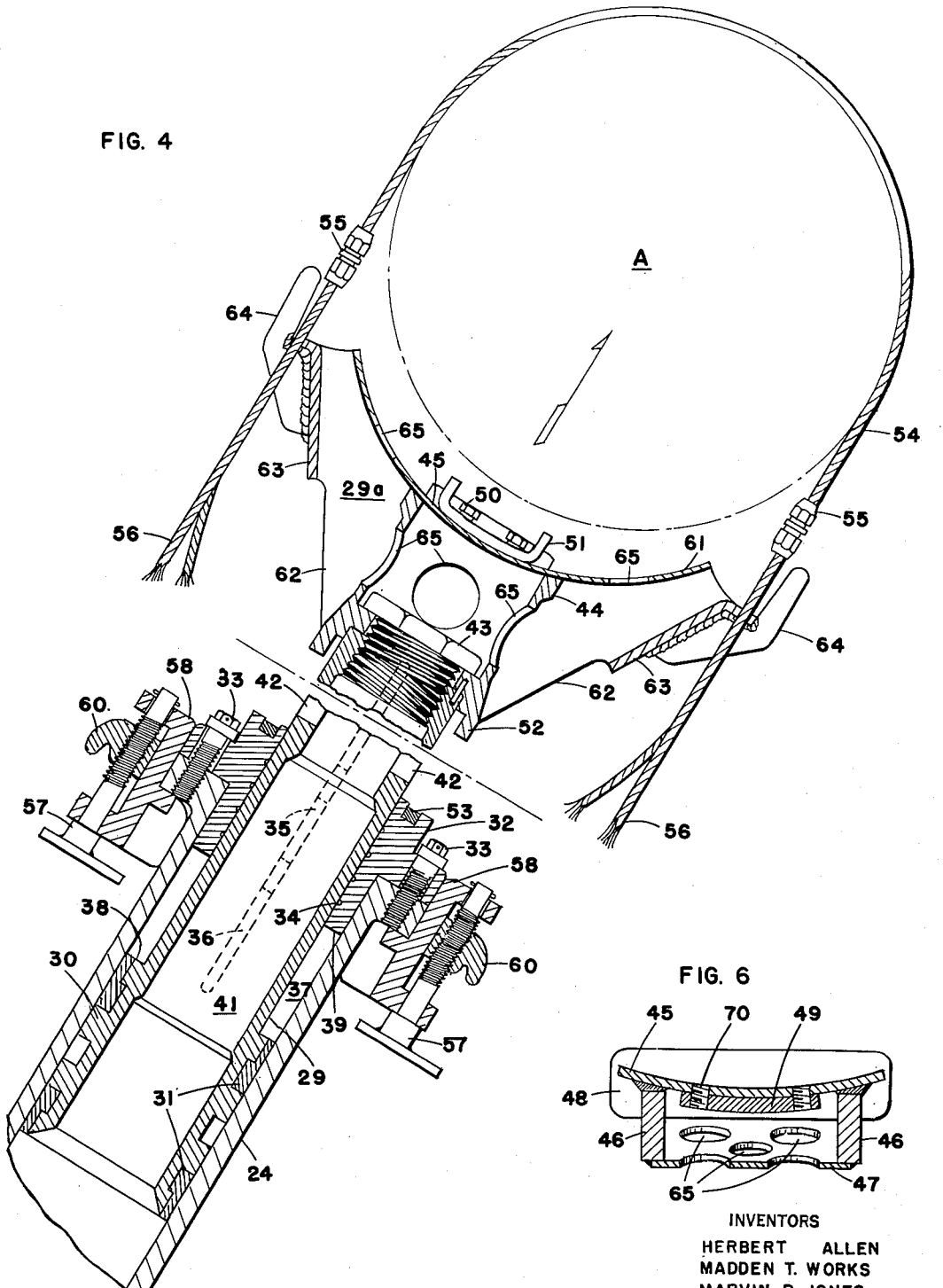
Fig. 4 is a change position sectional view with an intermediate portion omitted showing the location of the parts at the completion of a firing stroke.
Figure 6:
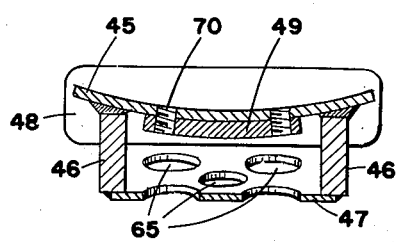
Fig. 6 is an enlarged detailed sectional view of one end of the cradle taken along a line substantially corresponding to line 6—6 of Fig. 5.

With further reference to Fig. 4, it will be noted that the continued outward movement of the arbor 29 under the expansion of the gases carries the upper ends of the elongated ports 42 past the upper face of the arbor guide bushing 32 thereby venting the expanding gases to the atmosphere. As this venting takes place, the force initially generated by the explosive charge is dissipated and the continued outward movement of the arbor is under the force of its own momentum which, if not counteracted, would cause the enlarged head portion 30 of the arbor to strike the arbor guide bushing 32 with a severe jolt. The present invention therefore provides that the outward movement of the arbor is snubbed in the latter part of its travel by entrapping a portion of the expanding gases in the annular chamber 37 and compressing them by continued movement of the arbor. The arbor is thus decelerated without any severe jarring of the projector and without deflecting or canting the arbor. Furthermore, since the restraining lashes were severed upon the intial movement of the arbor, the depth charge is catapulted free of the cradle in an undistorted trajectory.

Figure 10:
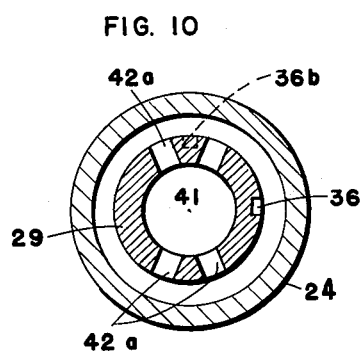
Fig. 10 is a transverse sectional view through the projector tube taken along a line substantially corresponding to line 10—10 of Fig. 1 and showing an alternate location for the exhaust ports.

As a safeguard the gases emitted through the ports 42 of the muzzle of the projector may be deflected so as to avoid personnel stationed nearby. If desired such ports may be divided as shown in Fig. 10 where four ports in all are shown. In that embodiment the two upper ports are spaced from each other at approximately 45° and the two lower ports are similarly spaced. The discharge of such gases may be further controlled by the location of key 35 with respect to ports 42. If desired the arbor may be rotated 90° by the use of a keyway located in the dotted line position 36b (Fig. 10) so that the gases may be vented upwardly and downwardly of the projector tube.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A missile projector comprising, a projector tube, an arbor reciprocable in said tube, means for projecting the arbor to propel the missile, a missile engaging cradle mounted on the end of the arbor, a securing line encircling the missile and provided with abutments adjacent its ends, severing means mounted on the tube and to which each end of the line is affixed so as to part said ends upon sudden pulling thereof, and line guiding fingers adjacent each abutment of the line and affixed to the cradle to assure simultaneous engagement with said abutments in order that both ends of the line will be severed at the initiation of a projecting operation.

2. In a missile projector having a projector tube and an arbor extensible from said tube, an arbor guide bushing in the muzzle end of said tube, an enlarged portion on the lower end of said arbor, said bushing and said enlarged portion defining the ends of a chamber formed between the inner wall of the tube and the outer wall of the arbor, gaseous means for extending the arbor, valve means for diverting a portion of the gases into said chamber, said valve means being operable in response to predetermined extension of said arbor to release the extending force of the gases, and said valve means being operable upon further movement of said arbor to confine a portion of said gases in the chamber for cushioning the arbor in its outward movement.

3. In a missile projector having a projector tube and an extensible arbor in said tube, a missile receiving cradle carried on the upper end of said arbor, dual sets of forked projecting members each set on a different side of said cradle to provide guideways for a lashing cable, cable shearing means on the tube, a depth charge lashing cable having looped ends engaging the cable shearing means, and abutments engageable by said forked members to draw the cable loops into cable severing contact with said cable shearing means upon extension of said arbor, and said means having a shearing edge for severing the cable as the arbor is forceably extended from the tube.

4. In a missile projector having a projector tube, and an extensible arbor in said tube, a missile cradle carried on the upper end of the arbor, cable guideway members on the cradle, adjustable cable tension members on the tube, a missile securing cable having looped end portions for engagement with the tension members and threaded through the guideway members, abutments fast on the cable for engagement by said guideway members, so as to cause the cable looped end portions to be drawn suddenly into cable severing contact with said tension members upon extension of said arbor and a shear blade on each of the tension members for severing the looped ends of the cable upon sudden pulling thereof due to impact of said guideway members with said abutments.

5. In a missile projector having a projector tube and an arbor extensible from said tube; an arbor guide bushing in the muzzle end of said tube, an enlarged portion on the lower end of said arbor, said bushing and said enlarged portion defining the ends of a chamber formed between the inner wall of the tube and the outer wall of the arbor, gaseous means for extending the arbor, valve means for diverting a portion of the gases into said chamber, said valve means being operable in response to predetermined extension of said arbor to release the extending force of the gases, and said valve means being operable upon further movement of said arbor to confine a portion of said gases in the chamber for cushioning the arbor in its outward movement, a missile receiving cradle mounted for movement with the arbor, cable means for securing a missile in the cradle, adjustable means on said tube for applying tension to the cable means, and means for shearing said cable means under the impact of the arbor extending gaseous means prior to the cushioning action of the arbor in its outward movement.

References Cited in the file of this patent

UNITED STATES PATENTS

| | | |
|---|---|---|
| 576,917 | Thomas | Feb. 9, 1897 |
| 2,399,248 | Patrick et al. | Apr. 30, 1946 |
| 2,445,326 | Janney | July 20, 1948 |
| 2,481,546 | Walker | Sept. 13, 1949 |